(No Model.)
G. W. WALKER.
ELECTRICAL DISTRIBUTION BY STORAGE BATTERIES.
No. 386,225. Patented July 17, 1888.
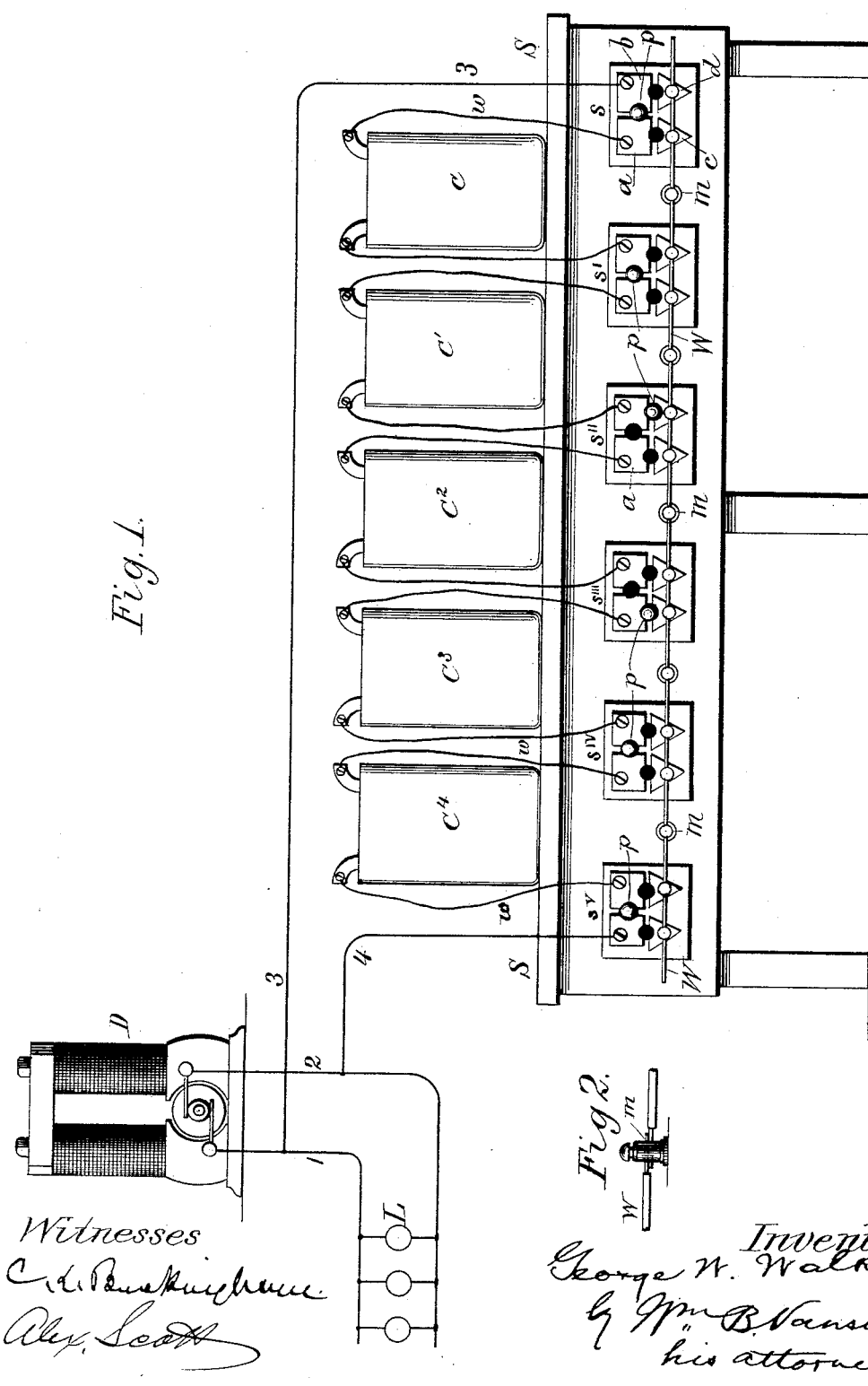

UNITED STATES PATENT OFFICE.

GEORGE W. WALKER, OF BETHLEHEM, PENNSYLVANIA.

ELECTRICAL DISTRIBUTION BY STORAGE-BATTERIES.

SPECIFICATION forming part of Letters Patent No. 386,225, dated July 17, 1888.

Application filed March 19, 1888. Serial No. 267,782. (No model.)

*To all whom it may concern:*

Be it known that I, GEORGE W. WALKER, a citizen of the United States, residing at Bethlehem, in the county of Northampton, State of Pennsylvania, have invented certain new and useful Improvements in Distribution by Storage-Batteries, of which the following is a specification.

My invention is an improvement in electrical distribution by the use of accumulators or storage-batteries.

The object is to provide for subjecting each and every cell to uniform activity or to uniform action, to provide for easily and quickly removing any cell for repair or for examination, and to provide cheap and simple apparatus for this purpose which can be easily operated by an inexperienced workman.

I prefer to arrange the cells of battery upon a suitable battery-stand, and between each and every pair of cells I place a switch having three or more electrical contact-points. The adjacent terminals of a pair of cells are connected to two of these contacts, and the third contact of each and every switch is connected to an electrical conductor—as a copper wire—extending the entire length of the series of cells, no matter what may be the space separating each pair of cells. This conductor must be easily separable between each pair of cells. I provide suitable means for connecting any two electrical contacts. This may take the form of a pin or an arm, as is well known. It would of course be possible to carry the terminals of each and every cell to a common central point and there connect with a switchboard, by which any combination of circuits might be attained; but this is objectionable in that it is more expensive and requires the cabling or other aggregation of a large number of conductors, which introduces an element of difficulty and danger always incident to the use of electricity in large quantity under such circumstances.

It is frequently the practice to charge the battery and supply the lamps from the dynamo simultaneously, and I have so illustrated the installation. Under these circumstances my improved apparatus operates to vary the arrangement of the battery both in respect to its charge and its discharge. Should the dynamo be disconnected, the arrangement of switches in the battery-circuit would operate to vary the number and arrangement of cells in the discharge circuit. Should the lamp-circuit be disconnected, the said switches would operate to vary the number and arrangement of cells in the charging-circuit. When both dynamo and lamps are connected through the battery, the switches operate to vary the distribution of electricity in both circuits simultaneously.

The accompanying drawings illustrate my invention.

Figure 1 is a complete view of my arrangement of apparatus. Fig. 2 is a detail.

D is a dynamo feeding lamps L in the circuit 1 2. A series of cells of accumulator or storage-battery, C C', is connected in multiple arc with lamps L by the wires 3 4. Between every pair of cells C C', &c., I place a switch, $s\ s^5$, consisting of three different electrical contacts, $a\ b\ c\ d$, the third contact (indicated by $c\ d$) being in two divisions for mechanical and economic reasons. Means for connecting any two of these contacts is provided. I prefer a pin, $p$, having upon one end a button of insulating material, though a pivoted arm may be substituted, as is well known. The first two contacts, $a$ and $b$, of each switch are connected by wires $w\ w$ to the terminals of adjoining cells, respectively, as represented in the drawings by switch $s''$, the contacts $a$ and $b$ of which are connected, respectively, to cells C' and $C^2$ by the wires $w$. All the switches are similarly connected except those represented at $s$ and $s^5$.

W is a wire, of copper, connecting together the third contacts of each and every switch. Between each pair of switches there is a simple switch device, as a screw-cup, $m$, and the wire W is divided, both ends being normally united by the switch device or screw-cup $m$.

Normally all cells are included in circuit. Pins $p$ therefore connect all pairs of contacts $a$ and $b$. If I desire to remove any cell, as $C^2$, I remove the pins $p$ from contact with $a$ and $b$ on both sides of said cell, and by inserting a pin, $p$, between $b$ and $d$ of switch $s''$ and a pin between $a$ and $c$ of switch $s'''$ cell $C^2$ is removed from circuit. If I retain the next cell, $C^3$, in circuit and remove cell $C^4$, it is necessary to divide the wire W between the cells so removed; otherwise the intervening cells would be short-circuited. I therefore sever the conductor at the switch device or screw-cup *m*. It will thus be seen that any cell may be removed without disturbing the operations of the installation, and that this may be accomplished by inexperienced workmen, the relative position and arrangement of the parts of the apparatus greatly facilitating this.

What I claim, and desire to secure by Letters Patent, is—

1. The combination of a series of cells of secondary battery, a series of switches consisting of three or more contacts and means for uniting any two contacts, one switch between each pair of cells, electrical connections between two contacts of each switch and the adjacent terminals of its pair of cells, respectively, and electrical connections between the third contact of each switch and an electrical conductor.

2. The combination of a series of cells of secondary battery, a series of switches consisting of three or more contacts and means for uniting any two contacts, one switch between each pair of cells, electrical connections between two contacts of each switch and the adjacent terminals of its pair of cells, respectively, electrical connections between the third contact of each switch and an electrical conductor, and means for dividing said conductor between any pair of switches.

3. The combination of a series of battery-cells, an electric circuit containing translating devices to be fed by said cells, a series of switches or cut-outs for connecting or disconnecting individual cells with respect to said circuit, and a conductor uniting one contact on each of said series of switches, substantially as described.

4. The combination of a main circuit, a series of cells of secondary battery, and a series of switches or cut-outs, one cut-out being assigned to a pair of cells and consisting of three or more contacts, one of which contacts is connected to a terminal of one cell, the second contact connected to a terminal of the second cell, and the third contact connected to an electrical conductor common to one contact of the series of switches.

GEORGE W. WALKER.

Witnesses:
J. B. KEMERER,
ROBT. H. WOLLE.